United States Patent [19]

Baker et al.

[11] Patent Number: 4,908,063

[45] Date of Patent: Mar. 13, 1990

[54] ADDITIVE COMPOSITION FOR WATER-BASED INKS

[75] Inventors: Timothy J. Baker, Claremore; John H. Woods, Tulsa, both of Okla.; Jeffrey R. Zerr, Irving, Tex.

[73] Assignee: Petrolite Corporation, St. Louis, Mo.

[21] Appl. No.: 267,064

[22] Filed: Nov. 4, 1988

[51] Int. Cl.⁴ .............................................. C09D 11/00
[52] U.S. Cl. ......................................... 106/31; 106/22
[58] Field of Search ................. 106/31, 270, 271, 22; 524/276

[56] References Cited

U.S. PATENT DOCUMENTS

| | | | |
|---|---|---|---|
| 3,249,448 | 5/1966 | Coburn et al. | 106/31 |
| 3,441,628 | 4/1969 | Ratzsch | 106/31 |
| 3,563,910 | 2/1971 | Fishman | 568/618 |
| 4,246,150 | 1/1981 | Bower | 106/270 |
| 4,459,388 | 7/1984 | Hettche et al. | 106/270 |
| 4,499,225 | 2/1985 | Kubo et al. | 524/276 |

FOREIGN PATENT DOCUMENTS 899612  1/1982  U.S.S.R. ................................ 106/31

*Primary Examiner*—Theodore Morris
*Attorney, Agent, or Firm*—Stanley M. Tarter

[57] ABSTRACT

An aqueous dispersion useful in formulating water-based printing inks is provided. The dispersion contains water, an alkoxylated primary linear polymeric alcohol dispersant and a finely divided mostly linear aliphatic hydrocarbon having a molecular weight of about 300–3,000 and/or a finely divided chemically modified mostly linear aliphatic hydrocarbon having a molecular weight of about 300–3,000.

22 Claims, No Drawings

ADDITIVE COMPOSITION FOR WATER-BASED INKS

FIELD OF THE INVENTION

1. Background of the Invention

This invention relates to a new and useful additive composition for water-based inks. More particularly, this invention relates to an aqueous dispersion for use as a water-based ink formulation additive for improving the performance of such inks in terms of gloss, adhesion, slip and the like.

There are four (4) general classes of printing inks. There are letter press and lithographic inks, also known as oil inks or paste inks, and there are flexographic and rotogravure inks, also known as solvent or liquid inks. This invention is concerned with a particular class of flexographic and rotogravure inks which are water-based. Although these inks have certain characteristics in common with inks used in other printing processes, they form a distinct class because of the character of the printing processes in which they are used, their applications and their formulations. The main distinction of flexographic and rotogravure inks is that they are normally of low viscosity compared to other classes of printing inks.

Flexographic and rotogravure inks have, in the past, been prepared by dispersing pigments or other colorants in volatile organic solvents such as alcohols, ketones and hydrocarbons. Due to environmental problems associated with the use of inks formulated with volatile organic solvents, water-based flexographic and rotogravure inks are becoming more important.

In flexographic printing, a form of rotary letter press uses a flexible plate, such as rubber, and fluid inks. Originally, flexographic printing was primarily used for paper bag printing but subsequently proved suitable for printing almost any kind of flexible packaging material. Flexographic inks generally consist of pigment dispersed in a vehicle made by dissolving one or more resins in a solvent, such as a volatile organic solvent or water. The water-based flexographic inks are widely used on paper and paper board. The vehicles for water-based inks are usually made from acrylic copolymers, acidic rosin esters, shellac, acidic styrene copolymers and various additives, such as waxes. The advantages of water-based inks include good press stability and printability, absence of fire hazard and volatile organic solvent emissions, convenience and the economy of water as a diluent and for wash-up. Since the water-based inks do not use volatile organic solvents, their use is gaining favor over the use of organic solvent-based inks.

Rotogravure inks normally comprise a pigment, a resin, a polymer or wax additive and a solvent. As in flexographic inks, water-based rotogravure inks are gaining favor over organic solvent-based inks because of environmental and worker hazard considerations.

In general, water-based inks are a mixture of water, resin, emulsifier or dispersing agent, a pigment and a polymer or wax additive. There exists a need to improve water-based inks in terms of gloss, maintenance, rub resistance, adhesion, slip, water resistance and other desirable properties.

2. Prior Art

U.S. Pat. No. 2,925,349 discloses a polish which utilizes alcohols having up to 20 carbon atoms as dispersants. Such alcohols may be oxyethylated.

U.S. Pat. No. 3,533,811 discloses a water-based printing ink comprising a water-missible organic solvent, film forming resins which are soluble in the water-missible solvent, pigment, soluble protein, a polymer latex and a volatile base. The water-missible organic solvents which are used are lower aliphatic alcohols and the lower alkylene glycols and their esters and ethers.

U.S. Pat. No. 3,563,910 discloses alkoxylated alcohols having up to 38 carbon atoms as emulsifiers for water/hydrocarbon mixtures.

U.S. Pat. No. 3,884,707 discloses a water-based ink comprising a basic dye, water, an organic solvent and a resin. The organic solvents employed are, for example, ethylene glycol and its ethers.

U.S. Pat. No. 4,686,260 discloses a process for preparing a polymer emulsion for a water-based ink which contains colloidally suspended polymer. The emulsifiers used are anionic, cationic or nonionic emulsifiers or mixtures thereof such as a variety of alcohols and ethylene oxide derivatives of long-chained carboxylic acids such as lauric, myristic, palmitic, oleic and stearic acids. Also, analogous ethylene oxide condensates of long-chained alcohols, such as octyl, decyl, stearyl and cetyl alcohols are used.

SUMMARY OF THE INVENTION

In accordance with the present invention, it has been found that an aqueous dispersion of certain high molecular weight alkoxylated primary alcohols, a finely divided mostly linear aliphatic hydrocarbon having a molecular weight of about 300–3,000 and/or partially oxidized or similarly modified mostly linear aliphatic hydrocarbon having a molecular weight of about 300–3,000 improves the print characteristics of water-based inks. The water-based inks to which the additive compositions of the present invention are added have improved adhesion, gloss, slip properties and other desirable characteristics.

Accordingly, an object of this invention is to prepare a new and useful water-based ink additive composition containing water, the described alkoxylated alcohol, and the described aliphatic hydrocarbon and/or modified hydrocarbon. Such dispersions are imminently suitable as ink additive systems and can be used to significantly improve the performance of water-based inks.

Another object of the invention is to prepare a water-based ink of improved performance, containing an ink additive composition which includes water, the described alkoxylated primary alcohol and the described hydrocarbon and/or modified hydrocarbon.

DESCRIPTION OF THE PREFERRED EMBODIMENTS

It has been found that aqueous dispersions of a high molecular weight alkoxylated alcohol having an average chain length in the hydrocarbon portion of the alcohol of from about 18 to about 150 carbon atoms, preferably from about 40 to about 90 carbon atoms, especially about 50 carbon atoms, and a finely divided mostly linear aliphatic hydrocarbon having a molecular weight of about 300–3,000 and/or partially oxidized or similarly modified mostly linear aliphatic hydrocarbon having a molecular weight of about 300–3,000.

The dispersants used in formulating the water-based ink additive systems of the invention are represented by alkoxylated alcohols of the formula:

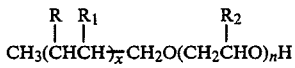

wherein R and $R_1$ individually represent hydrogen or the same or different lower alkyl groups of from 1 to about 10 carbon atoms; $R_2$ represents hydrogen or a methyl group; x represents a number of from about 8 to about 75 and preferably from about 19 to about 44, and indicates the average number of carbon atoms in the hydrocarbon portion of the chain; and n represents the average number of oxyalkylene groups present in the molecule and is a number of 2 to about 65 and preferably about 4–50. The average molecular weight of the alkoxylated alcohols may range from about 400 to about 8,000. The relative efficiency of the hydrophilic and lipophilic portions of the molecular can be controlled by the addition of varying amounts of ethylene oxide.

The dispersants are prepared by alkoxylation of alcohols represented by the formula:

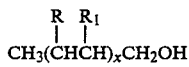

wherein R, $R_1$ and x are defined above. Alkoxylating agents include ethylene oxide, propylene oxide and mixtures thereof. The starting materials can be readily alkoxylated with the just described alkylene oxides using typical base catalysts, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation.

By varying the molecular weight of the starting alcohol and the amount of alkoxylation, a variety of compounds of varying molecular weights can be prepared. Thus, the molecular weight of the starting alcohol may be chosen to have an average molecular weight of from about 270 to about 2,000.

The primary linear polymeric alcohols to be alkoxylated are commercially available under the trade name UNILIN TM alcohols from Petrolite Corporation, Specialty Polymers Group, Tulsa, Okla.

Also included in the aqueous dispersions of the present invention is a finely divided mostly linear saturated aliphatic hydrocarbon having a molecular weight of between about 300 and about 3,000.

Such hydrocarbons include various polyethylenes. The polyethylene used in preparation of the dispersions of the present invention may be described as having a molecular weight of about 700–3,000. The polyethylene may be linear or may have a number of branch formations in its molecular structure. When branched the polyethylenes preferably have one or two branches per molecule on the average and the branches may have 1 to 6 carbons, preferably $C_1$–$C_6$ alkyl group.

In addition to the polyethylenes, the aliphatic saturated hydrocarbon component of the dispersion of the present invention may comprise petroleum-derived waxes, such as paraffin and microcrystalline waxes. The paraffin waxes are mostly linear alkanes having about 20-36 carbon atoms per molecule on the average and a molecular weight of about 280–500 and may include $C_{18}$–$C_{36}$ isoalkanes and cycloalkanes. The microcrystalline waxes have molecular weights of about 500–700 with somewhat more branching than the paraffin waxes.

Furthermore, the aliphatic saturated hydrocarbon component of the dispersion of the present invention includes Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600–1,000.

Also contemplated in the present invention are the above described hydrocarbons which may have been chemically modified without sacrificing the ink enhancing properties of the dispersion of the present invention. These include the partially oxidized polyethylenes, polymethylenes and the petroleum-derived waxes. The oxidized low molecular weight mostly linear hydrocarbons of a molecular weight of 300–3,000 have multiple functional groups, such as carboxylic acid, ketones, alcohols, esters, etc., distributed along their chains. The functional groups are the result of the oxidation of these hydrocarbons by an oxygen-containing gas at elevated temperatures, as is well known in the art.

The functional groups of the oxidized hydrocarbons may be generally quantified by determination of an acid number which is the amount of potassium hydroxide in milligrams required to neutralize one gram of the oxidized polymer. The oxidized hydrocarbons will normally have an acid number in the range of from about 5 to about 25.

Also, the polyethylenes, besides being homopolymers, may be copolymers of ethylene with propylene, butylene, etc. and oxygen-containing units such as vinyl acetate, acrylic acid, etc., as long as the ink enhancing properties are retained.

Other closely related material that can be used include the natural waxes, such as beeswax, carnauba and candelila waxes.

It is important that the hydrocarbon and/or modified hydrocarbon components of the dispersion of the present invention be finely divided particles. For best results, these components should have an average particle size of less than 20 microns and preferably less than 15 microns and more than 1 micron. Such particle sizes may be obtained by micronizing larger particles of the hydrocarbon and/or modified hydrocarbon component or may be attained by precipitation from solutions thereof. It is desirable that they have a broad particle size distribution which may best be achieved directly, for example, by precipitation, or may be achieved by blending micronized products of different particle sizes.

One method of preparing of the aqueous dispersion of the present invention is by the following procedure:

1. The final solids content of the dispersion which is desired is determined. The maximum solids content attainable will vary with the molecular weight and the amount of alkoxylation of the described dispersants.
2. The amount of water needed is weighed into an agitated dispersion vessel and the amount of dispersant needed is added to a separate container.
3. The dispersant is heated to 15°–20° F. (8°–11° C.) above its melting point which may range from about 180°–250° F. (82°–121° C.); and, at the same time, the water is heated to about 190° F. (88° C.).

4. When both components are heated to the appropriate temperatures, the dispersant is slowly poured into the heated water which is at the same time vigorously stirred.
5. When all of the dispersant has been added to the water, the heat source is removed and stirring is continued for 2 to 3 additional minutes.
6. The dispersion is slowly stirred, cooling at the rate of about 2°–4° F. (1°–2° C.) per minute. When the temperature reaches about 140° F. (60° C.), the cooling rate may be increased or held constant until the desired pour temperature is reached. A stable dispersion results.
7. The finely divided hydrocarbon and/or modified hydrocarbons is thereafter incorporated in the resulting dispersion.

The addition of a small amount of the dispersion of the present invention in inks notably improves the performance of such inks in regard to gloss, immediate adhesion, delayed adhesion, coefficient of friction (COF), wet rub, dry rub and water resistance. Gloss can be determined using conventional glossmeters, adhesion can be determined by adhesive tape pull tests, slip can be determined using conventional slide angle/slip and friction testers, rub resistance can be determined using a Sutherland Rub Tester and water resistance can be determined by a water drop test at 10, 30 and 60 second application intervals. These are standard tests employed by the industry.

The preferred composition of the present invention is an aqueous dispersion having a solids content of at least 8.0% by weight. Normally, the solids content of the dispersion may be much higher in the range of at least 20% by weight and as high as 70% by weight. Dispersions useful for adding to water-based inks in accordance with the present invention may contain about 30–92% by weight water, about 2–40% by weight alkoxylated alcohol and about 1–60% by weight of hydrocarbon and/or modified hydrocarbon. The amount of hydrocarbon to modified hydrocarbon may range from 0 to 100% hydrocarbon. Preferably, the dispersion will comprise about 40–80% by weight water, 2–20% by weight alcohol and 1–40% by weight of hydrocarbon and/or modified hydrocarbon.

It has been found that excellent results are obtained when a mixture of oxidized and unoxidized polyethylenes as the hydrocarbon mixture are used. The most preferred composition is 50–85% water, 2–15% alkoxylated alcohol and 10–35% of oxidized plus unoxidized polyethylene. It is preferred for the oxidized polyethylene portion of the mixture to be about 50–95% and the unoxidized polyethylene portion of the mixture to be about 5–50%. Excellent results have been obtained where the composition contains 70–80% oxidized polyethylene and 20–30% unoxidized polyethylene.

Water-based inks containing about 0.5 to about 10% by weight of the dispersion of the present invention have improved properties. The preferred amount of the dispersion in the inks is about 1–8% by weight.

In the following examples, all percentages are on a weight/weight basis unless otherwise indicated.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLE I

This example illustrates preparation of the alkoxylated alcohol component which serves as the dispersant of the composition of the present invention.

A primary linear alcohol of the following formula was prepared by oxidation of a corresponding polyethylene precursor:

$$CH_3(CH_2CH_2)_xCH_2OH$$

wherein x about 23.

This olefin-derived linear polymeric alcohol was ethoxylated in a conventional manner to provide an ethoxylated alcohol having a molecular weight of about 1,400 and 16 ethylene oxide units per mole of polymer on the average and melting about 224° F. (107° C.).

EXAMPLE II

This example illustrates the preparation of an aqueous dispersion of the ethoxylated alcohol prepared in Example I.

Using the formulating procedure as described above, a suitable quantity of water was heated to 190° F. (88° C.). In a separate vessel the alcohol was heated to a molten condition. Then, molten ethoxylated alcohol was added to the hot water under high shear conditions to yield a 25% by weight aqueous dispersion of the ethoxylated alcohol and cooled. This dispersion was designated Composition 1.

EXAMPLE III

This example illustrates the preparation of the micronized low molecular weight polyethylenes.

Linear polyethylene of an average molecular weight of about 2,000 was used in the following examples. Oxidized polyethylene used in the following examples was prepared by air oxidizing a linear polyethylene of a molecular weight of 1,500 to an acid number of 18. The unoxidized polyethylene portion and the oxidized polyethylene portion separately were comminuted using conventional micronizing equipment. Portions of each polyethylene were comminuted to average sizes of 6 microns and 10 microns.

EXAMPLE IV

This example illustrates the preparation of an aqueous dispersion containing the ethoxylated alcohol and a mixture of oxidized and unoxidized micronized low molecular weight linear polyethylenes.

To 100 parts by weight of the aqueous dispersion prepared in accordance with Example II, 1.9 parts by weight of the oxidized polyethylene (MW=1,500) and 0.6 parts by weight of the unoxidized polyethylene (MW=2,000) were added and vigorously blended into the dispersion. The unoxidized polyethylene had an average size of 10 microns and the oxidized polyethylene had an average size of 6 microns. The resulting composition was given the designation of Composition 2.

EXAMPLE V

In this example, an aqueous dispersion was prepared by mixing at a temperature of 250° F. (121° C.) under pressure water, the alkoxylated alcohol of Example I and unoxidized linear polyethylene wax having a molecular weight of 2,000 to produce a dispersion composed of 60% by weight water, 19% by weight alkoxylated alcohol and 21% by weight polyethylene. Upon cooling the polyethylene precipitated as finely divided particles having an average size of 2 microns. The resulting dispersion was designated Composition 3.

EXAMPLE VI

In this example, a dispersion of 60% water and 40% solids was prepared. Of the solids 80% was composed of the alkoxylated alcohol of Example I and 10% by weight of oxidized polyethylene (MW=1,500) having a 6 micron size and 10% by weight of unoxidized polyethylene (MW=2,000) having a 10 micron size was prepared. The resulting dispersion was designated Composition 4.

EXAMPLE VII

This example illustrates the preparation of a water-based ink.

The following ink composition was prepared:

| Ingredient | Weight % | Supplier |
|---|---|---|
| Joncryl 61-LV | 13.0 | S. C. Johnson |
| Water | 2.5 | — |
| Isopropanol (95%) | 4.5 | — |
| Foamburst 320 CT | 1.0 | Ross Chemical |
| Neocryl A-1054 | 55.0 | ICI Resins |
| Flexiverse BCD5103 | 24.0 | Sun Chemical |

This preparation was accomplished by weighing Joncryl 61-LV emulsifier and water into a mixing tub. Then, Foamburst 320CT antifoam, isopropanol and Neocryl A-1054 acrylic resin dispersion were added to the tub and mixed thoroughly with the other ingredients therein. Finally, the Flexiverse BCD5103 blue pigment was added to the tub and mixed thoroughly with the ingredients therein to form a well dispersed ink composition.

EXAMPLE VIII

Water-based blue surface inks containing compositions of the present invention were applied to various substrates at different levels of the micronized polyethylene polymers of low molecular weight of the present invention and were tested for gloss, 90° degree delayed adhesion, static coefficient of friction (slide angle) and dynamic coefficient of friction (slide angle) using a four color, flexographic press. Composition 5 was an aqueous dispersion of Example II containing a surfactant coated micronized branched polyethylene of about 700 molecular weight.

Higher gloss readings and higher adhesions are desirable properties and lower coefficients of friction are also desirable properties in the following table.

TABLE 1

| Gloss on Low Density Polyethylene Substrate | | |
|---|---|---|
| Ink Additive | Ink Additive % | Glossmeter Reading |
| Composition 2 | 3 | 77 |
| Composition 2 | 6 | 76 |
| Composition 3 | 1.25 | 80 |
| Composition 3 | 3.75 | 74 |
| Composition 5 | 5 | 80 |

TABLE 2

| Gloss on Polypropylene Film | | |
|---|---|---|
| Ink Additive | Ink Additive % | Glossmeter Reading |
| Composition 2 | 3 | 87 |
| Composition 2 | 6 | 79 |
| Composition 3 | 1.25 | 86 |
| Composition 3 | 3.75 | 68 |
| Composition 5 | 5 | 80 |

TABLE 3

| 90° Delayed Adhesion on Low Density Polyethylene Substrate | | |
|---|---|---|
| Ink Additive | Ink Additive % | Rating |
| Composition 2 | 3 | 10.0 |
| Composition 2 | 6 | 10.0 |
| Composition 3 | 1.25 | 9.0 |
| Composition 3 | 3.75 | 7.5 |
| Composition 5 | 5 | 8.0 |

TABLE 4

| 90° Delayed Adhesion on Polypropylene Film | | |
|---|---|---|
| Ink Additive | Ink Additive % | Rating |
| Composition 2 | 3 | 1.0 |
| Composition 2 | 6 | 10.0 |
| Composition 3 | 1.25 | 4.5 |
| Composition 3 | 3.75 | 8.0 |
| Composition 5 | 5 | 6.5 |

TABLE 5

| Static COF* on Low Density Polyethylene Substrate | | |
|---|---|---|
| Ink Additive | Ink Additive % | COF |
| Composition 2 | 3 | 0.43 |
| Composition 2 | 6 | 0.49 |
| Composition 3 | 1.25 | 0.48 |
| Composition 3 | 3.75 | 0.47 |
| Composition 5 | 5 | 0.47 |

TABLE 6

| Static COF on Polypropylene Film | | |
|---|---|---|
| Ink Additive | Ink Additive % | COF |
| Composition 2 | 3 | 0.58 |
| Composition 2 | 6 | 0.57 |
| Composition 3 | 1.25 | 0.59 |
| Composition 3 | 3.75 | 0.50 |
| Composition 5 | 5 | 0.47 |

*Coefficient of Friction as measured using slide angle test employing Testing Machines, Inc., Model No. 32-25-00.

TABLE 7

| Dynamic COF on Low Density Polyethylene Substrate | | |
|---|---|---|
| Ink Additive | Ink Additive % | COF |
| Composition 2 | 3 | 0.31 |
| Composition 2 | 6 | 0.34 |
| Composition 3 | 1.25 | 0.32 |
| Composition 3 | 3.75 | 0.37 |
| Composition 5 | 5 | 0.34 |

TABLE 8

Static COF on Polypropylene Film

| Ink Additive | Ink Additive % | COF |
|---|---|---|
| Composition 2 | 3 | 0.38 |
| Composition 2 | 6 | 0.33 |
| Composition 3 | 1.25 | 0.38 |
| Composition 3 | 3.75 | 0.26 |
| Composition 5 | 5 | 0.31 |

In this example, the speed of the printer was held constant at 200 feet/minute and each run was about a minute long. The wet temperature on the drier was held at 170° F. (77° C.) for all the runs. This example shows that the water-based printing aid compositions of the present invention are useful in the formulation of water-based inks.

EXAMPLE IX

This example illustrates the results of using compositions of the present invention wherein different combinations of unoxidized polyethylene and oxidized polyethylene in different finely divided sizes were employed.

In each of the following compositions various linear polyethylene species were added to an aqueous dispersion prepared in accordance with Example II. The total amount of added polyethylene was 2.5% by weight of the resulting composition.

The first species of polyethylene was a mixture of 50% unoxidized polyethylene of 2,000 molecular weight and a particle size of 6 microns and 50% unoxidized polyethylene of 2,000 molecular weight and a particle size of 10 microns.

The second species of polyethylene was a mixture of 50% by weight oxidized polyethylene of 1,500 molecular weight and a particle size of 6 microns and 50% by weight of oxidized polyethylene of 1,500 molecular weight and a particle size of 10 microns.

The third species of polyethylene was a mixture of 50% by weight of unoxidized polyethylene of 2,000 molecular weight and a particle size of 6 microns and 50% by weight oxidized polyethylene of 1,500 molecular weight and a particle size of 10 microns.

The fourth species of polyethylene was a mixture of 50% by weight of oxidized polyethylene of 1,500 molecular weight and a particle size of 6 microns and 50% by weight of unoxidized polyethylene of 2,000 molecular weight and a particle size of 10 microns.

The fifth species of polyethylene was a mixture of 50% by weight of unoxidized polyethylene (MW=700; 6 micron size) and 50% polyethylene added as a 30% solids aqueous dispersion by weight of a commercially available aqueous dispersion of polyethylene (30% solids). This fifth species was not made in accordance with Example II mentioned above; it is a stand alone product.

The sixth species of polyethylene was a mixture of 75% by weight of oxidized polyethylene of 1,500 molecular weight and a particle size of 6 microns and 25% by weight of unoxidized polyethylene of 2,000 molecular weight and a particle size of 10 microns.

The compositions of the various species of polyethylene mixtures and the ethoxylated alcohol of the present example were added to a standard water-based blue ink in an amount of 3.0% by weight. The resulting ink composition was applied to aluminum foil and polypropylene film and tested for various properties including gloss, slip, rub and adhesion. The results of such tests are summarized in Tables 9 and 10.

TABLE 9

Comparison on Aluminum Foil

| Composition | Gloss | Slip | Rub | Adhesion Ranking |
|---|---|---|---|---|
| PE Species 1 | 77 | .41/.21 | .09 | 2 |
| PE Species 2 | 72 | .42/.19 | .07 | 6 |
| PE Species 3 | 73 | .36/.20 | .07 | 2 |
| PE Species 4 | 73 | .38/.20 | .07 | 2 |
| PE Species 5 | 71 | .44/.23 | .08 | 5 |
| PE Species 6 | 79 | .42/.18 | .05 | 1 |

TABLE 10

Comparison on Polypropylene Film

| Composition | Gloss | Slip | Rub | Adhesion Ranking |
|---|---|---|---|---|
| PE Species 1 | 71 | .44/.23 | .08 | 2 |
| PE Species 2 | 68 | .39/.20 | .06 | 6 |
| PE Species 3 | 66 | .45/.20 | .07 | 2 |
| PE Species 4 | 68 | .43/20 | .07 | 2 |
| PE Species 5 | 62 | .48/.21 | .07 | 5 |
| PE Species 6 | 65 | .39/.15 | .06 | 1 |

From the Tables 9 and 10, it is noted that the combination of the use of oxidized polyethylene of 6 micron size and unoxidized polyethylene of 10 micron size when added to the aqueous dispersion of ethoxylated alcohol provides markedly better gloss, slip and adhesion in water-based inks as compared to the use of the standard additive when added to the same dispersion and slightly better properties over other tested combinations of oxidized and unoxidized polyethylenes.

EXAMPLE X

A second ethoxylated alcohol having a molecular weight of about 865 and an ethylene oxide content of 10 moles per mole of polymer was prepared.

EXAMPLE XI

In this example, an aqueous dispersion containing a mixture of paraffin wax and essentially linear unmodified polyethylene was prepared to form a 50% solids composition. Of the solids 10% by weight was composed of the alkoxylated alcohol of Example X and 90% by weight of paraffin wax (MP=147° F. (63.9° C.)). The dispersion was added to printing ink at an additive level of 3.0% by weight. The resulting ink when applied to various surfaces showed improved characteristics.

When used in small amounts by weight of the ink composition in water-based inks, the aqueous dispersions prepared in accordance with this example improve such inks in terms of gloss maintenance and rub resistance without sacrifice of adhesion of the inks to a substrate, of slip of the inks from the substrate and of water spot resistance of inks applied to a variety of substrates.

What is claimed is:

1. A water-based ink containing a pigment and an effective amount of a formulation aid comprising in an aqueous dispersion:
   (a) water;
   (b) a dispersant represented by the formula:

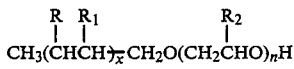

wherein R and $R_1$ are independently selected from the group consisting of hydrogen and $C_1$–$C_{10}$ alkyl; $R_2$ is selected from the group consisting of hydrogen and methyl and x is about 8 to about 75 and n is about 2 to about 65; and (c) a finely divided mostly linear aliphatic hydrocarbon and/or modified hydrocarbon having a molecular weight of about 300–3,000 and an average particle size of less than about 20 microns.

2. The ink of claim 1 wherein the dispersion contains: (a) about 20–92% by weight of water; (b) about 2–40% by weight of said dispersant; and (c) about 1–60% by weight of said mostly linear aliphatic hydrocarbon.

3. The ink of claim 2 wherein the said mostly linear aliphatic hydrocarbon and/or modified hydrocarbon is a mixture of unoxidized polyethylene and oxidized polyethylene.

4. The ink of claim 3 wherein the oxidized polyethylene comprises about 55–95% by weight of the mixture.

5. The ink of claim 4 wherein the oxidized polyethylene has an acid number of at least about 5.

6. The ink of claim 2 wherein the hydrocarbon contains a petroleum-derived wax.

7. The ink of claim 2 wherein the hydrocarbon contains a polymethylene.

8. The ink of claim 2 wherein the hydrocarbon is a mixture of paraffin wax and polyethylene.

9. A water-based pigmented ink containing an effective amount of a formulation aid comprising in an aqueous dispersion:

(a) water;
(b) a dispersant represented by the formula:

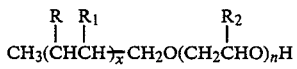

wherein R and $R_1$ are independently selected from the group consisting of hydrogen and $C_1$–$C_{10}$ alkyl; $R_2$ is selected from the group consisting of hydrogen and methyl and x is about 8–75 and n averages 4–50; and (c) a mixture of:

(1) a finely divided unoxidized polyethylene of a molecular weight of about 700 to about 3,000; and (2) a finely divided oxidized polyethylene of a molecular weight of about 700 to about 3,000.

10. A water-based pigmented ink containing an effective amount of a formulation aid comprising in an aqueous dispersion:

(a) about 30–92% by weight of water;
(b) about 2–40% by weight of a dispersant represented by the formula:

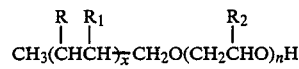

wherein R and $R_1$ are independently selected from the group consisting of hydrogen and $C_1$–$C_{10}$ alkyl; $R_2$ is selected from the group consisting of hydrogen and methyl and x is about 8–75 and n averages about 4–50; and (c) about 1–60% by weight of a mixture of:

(1) a finely divided unoxidized polyethylene of a molecular weight of about 700 to about 3,000; and (2) a finely divided oxidized polyethylene of a molecular weight of about 700 to about 3,000.

11. The ink of claim 10 wherein the oxidized polyethylene comprises about 55–95% by weight of the mixture.

12. The ink of claim 11 wherein the oxidized polyethylene has an acid number of at least about 5.

13. A water-based ink of claim 12 containing about 0.5 to about 10% by weight of the formulation aid.

14. A water-based ink of claim 3 containing about 0.5 to about 10% by weight of the formulation aid.

15. A water-based ink of claim 4 containing about 0.5 to about 10% by weight of the formulation aid.

16. A water-based ink of claim 5 containing about 0.5 to about 10% by weight of the formulation aid.

17. A water-based ink of claim 6 containing about 0.5 to about 10% by weight of the formulation aid.

18. A water-based ink of claim 7 containing about 0.5 to about 10% by weight of the formulation aid.

19. A water-based ink of claim 8 containing about 0.5 to about 10% by weight of the formulation aid.

20. A water-based ink of claim 9 containing about 0.5 to about 10% by weight of the formulation aid.

21. A water-based ink of claim 10 containing about 0.5 to about 10% by weight of the formulation aid.

22. A water-based ink of claim 11 containing about 0.5 to about 10% by weight of the formulation aid.

* * * * *